(12) United States Patent
Rupp et al.

(10) Patent No.: US 11,193,481 B2
(45) Date of Patent: Dec. 7, 2021

(54) SUMP PUMP SYSTEM AND CONTROL METHODOLOGY THEREFOR

(71) Applicants: Charles E. Rupp, Northwood, OH (US); Brian J. Rupp, Monroeville, OH (US)

(72) Inventors: Charles E. Rupp, Northwood, OH (US); Brian J. Rupp, Monroeville, OH (US)

( * ) Notice: Subject to any disclaimer, the term of this patent is extended or adjusted under 35 U.S.C. 154(b) by 25 days.

(21) Appl. No.: 16/662,557

(22) Filed: Oct. 24, 2019

(65) Prior Publication Data

US 2020/0132068 A1 Apr. 30, 2020

Related U.S. Application Data

(60) Provisional application No. 62/753,107, filed on Oct. 31, 2018.

(51) Int. Cl.
| | |
|---|---|
| *F04B 49/10* | (2006.01) |
| *G05D 9/12* | (2006.01) |
| *F04B 23/02* | (2006.01) |
| *F04D 15/02* | (2006.01) |
| *F04B 49/06* | (2006.01) |

(52) U.S. Cl.
CPC .......... *F04B 49/065* (2013.01); *F04B 23/021* (2013.01); *F04B 49/10* (2013.01); *F04D 15/0218* (2013.01); *G05D 9/12* (2013.01)

(58) Field of Classification Search
CPC .... F04D 15/0218; F04B 23/021; F04B 49/10; F04B 49/065; G05D 9/12

USPC .................................................... 417/36, 38
See application file for complete search history.

(56) References Cited

U.S. PATENT DOCUMENTS

| | | | |
|---|---|---|---|
| 4,222,711 A | 9/1980 | Mayer | |
| 4,228,427 A | 10/1980 | Niedermeyer | |
| 4,437,811 A | 3/1984 | Iwata et al. | |
| 5,314,313 A | 5/1994 | Janesky | |
| 5,449,274 A | 9/1995 | Kochan, Jr. | |
| 5,503,533 A | 4/1996 | Potter et al. | |
| 5,667,362 A | 9/1997 | Murai et al. | |
| 5,672,050 A | 9/1997 | Webber et al. | |
| 6,254,350 B1 | 7/2001 | Koenig et al. | |
| 6,322,325 B1 | 11/2001 | Belehradek | |
| 6,364,620 B1 | 4/2002 | Fletcher et al. | |
| 6,390,780 B1 | 5/2002 | Batchelder et al. | |
| 6,499,961 B1 | 12/2002 | Wyatt et al. | |
| 6,676,382 B2 | 1/2004 | Leighton et al. | |
| 7,264,449 B1 * | 9/2007 | Harned | F04D 15/0218 417/36 |
| 7,309,216 B1 | 12/2007 | Spadola, Jr. et al. | |

(Continued)

*Primary Examiner* — Patrick Hamo
(74) *Attorney, Agent, or Firm* — MacMillan, Sobanski & Todd, LLC

(57) ABSTRACT

A sump pump system includes a plurality of sump pumps adapted to be disposed within a crock. The sump pump system also includes a plurality of water level sensors adapted to be disposed within the crock. Each of the plurality of water level sensors generates water level signals. The sump pump system further includes a plurality of electronic controllers. Each of the plurality of water level sensors is connected to each of the plurality of electronic controllers, and each of the plurality of electronic controllers is connected to operate each of the plurality of sump pumps in response to the water level signals.

10 Claims, 4 Drawing Sheets

(56) References Cited

U.S. PATENT DOCUMENTS

| | | | | |
|---|---|---|---|---|
| 7,373,208 B2* | 5/2008 | Ozaki | ............ | G05B 9/03 |
| | | | | 34/531 |
| 7,373,817 B2* | 5/2008 | Burdi | ............ | F04D 15/0218 |
| | | | | 340/620 |
| 7,429,842 B2 | 9/2008 | Schulman et al. | | |
| 7,458,782 B1 | 12/2008 | Spadola, Jr. et al. | | |
| 8,047,805 B2* | 11/2011 | Bourell, Jr. | ............ | F04D 15/0218 |
| | | | | 417/36 |
| 8,430,641 B2* | 4/2013 | Noel | ............ | F04B 49/025 |
| | | | | 417/41 |
| 8,435,009 B2 | 5/2013 | Moore et al. | | |
| 8,907,789 B2 | 12/2014 | Kochan, Jr. et al. | | |
| 9,528,520 B2 | 12/2016 | Cummings | | |
| 9,958,878 B2 | 5/2018 | Kochan, Jr. et al. | | |
| 2007/0258827 A1* | 11/2007 | Gierke | ............ | F04D 13/068 |
| | | | | 417/6 |
| 2008/0229819 A1* | 9/2008 | Mayleben | ............ | H01G 5/0132 |
| | | | | 73/304 C |
| 2012/0251333 A1* | 10/2012 | Irwin | ............ | F04B 17/03 |
| | | | | 417/40 |

* cited by examiner

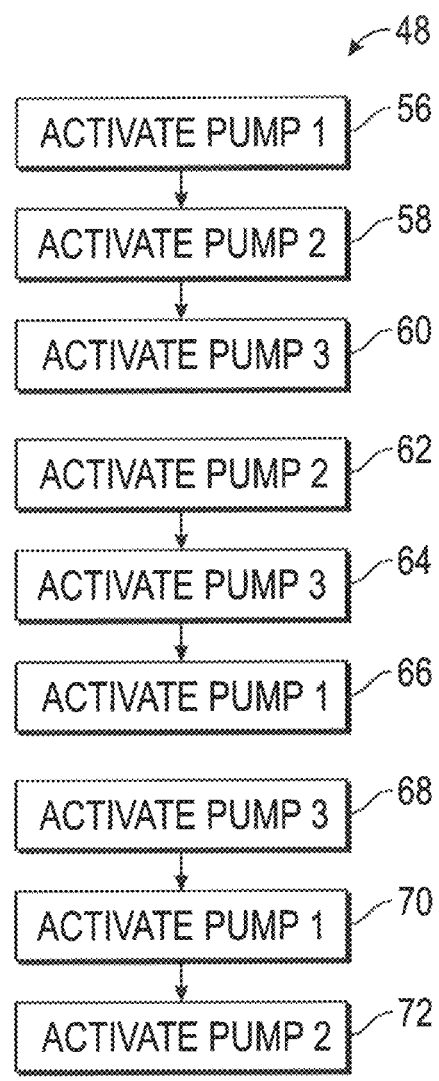
FIG. 5
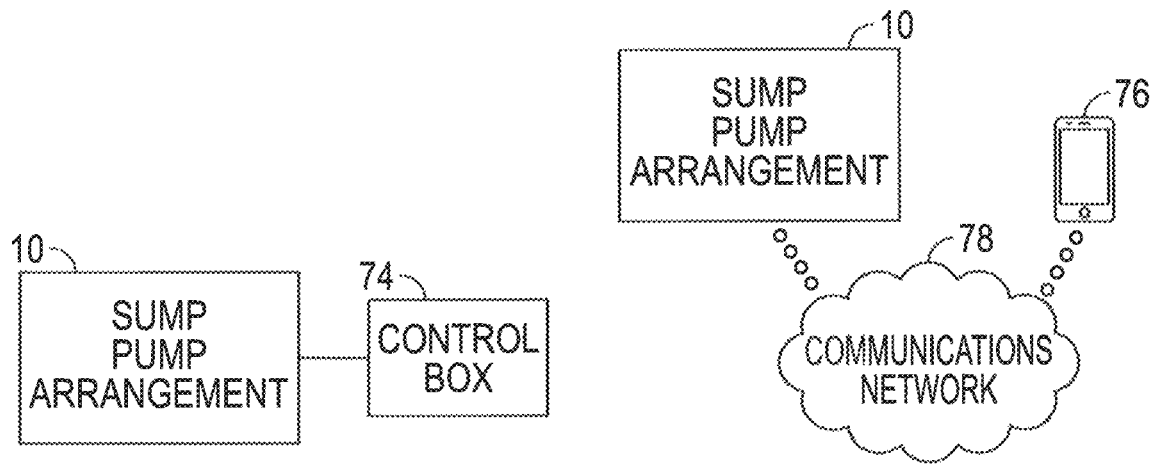
FIG. 6
FIG. 7

SUMP PUMP SYSTEM AND CONTROL METHODOLOGY THEREFOR

CROSS-REFERENCE TO RELATED APPLICATIONS

This application claims the benefit of United States Provisional Application No. 62/753,107, filed Oct. 31, 2018, the disclosure of which is incorporated herein by reference.

BACKGROUND OF THE INVENTION

This invention relates in general to sump pumps. In particular, this invention relates to an improved structure and control methodology for a sump pump system that has improved reliability and monitoring capabilities.

Sump pumps are often provided in the basements or other lower levels of buildings and other structures. A typical sump pump includes both a water pump and a water level sensor for selectively actuating the water pump. The sump pump is typically disposed within a crock or other liquid reservoir that is provided within a floor of the building and that is configured to accumulate water that may enter the building. The water level sensor determines the level of the water contained within the crock. When the water level within the crock reaches a predetermined upper level, the sump pump is actuated to pump water out of the crock and away from the building. Subsequently, when the water level within the crock reaches a predetermined lower level, the sump pump is de-actuated.

Although known sump pumps have functioned satisfactorily in the past, it would be desirable to provide an improved structure and control methodology for a sump pump system that has improved reliability and monitoring capabilities.

SUMMARY OF THE INVENTION

This invention relates to an improved structure and control methodology for a sump pump system that has improved reliability and monitoring capabilities. The sump pump system includes a plurality of sump pumps adapted to be disposed within a crock. The sump pump system also includes a plurality of water level sensors adapted to sense a water level within the crock. Each of the plurality of water level sensors generates water level signals. The sump pump system further includes a plurality of electronic controllers. Each of the plurality of water level sensors is connected to each of the plurality of electronic controllers, and each of the plurality of electronic controllers is connected to operate each of the plurality of sump pumps in response to the water level signals.

Various aspects of this invention will become apparent to those skilled in the art from the following detailed description of the preferred embodiments, when read in light of the accompanying drawings.

BRIEF DESCRIPTION OF THE DRAWINGS

FIG. 5 are flow charts of a third method of operating the improved sump pump and control systems illustrated in FIGS. 1 and 2.

FIG. 6 is a schematic diagram of the improved sump pump and control systems illustrated in FIGS. 1 and 2 shown connected to a local control box.

FIG. 7 is a schematic diagram of the improved sump pump and control systems illustrated in FIGS. 1 and 2 shown connected to an internet-enabled device.

DETAILED DESCRIPTION OF THE PREFERRED EMBODIMENTS

Figure 1:
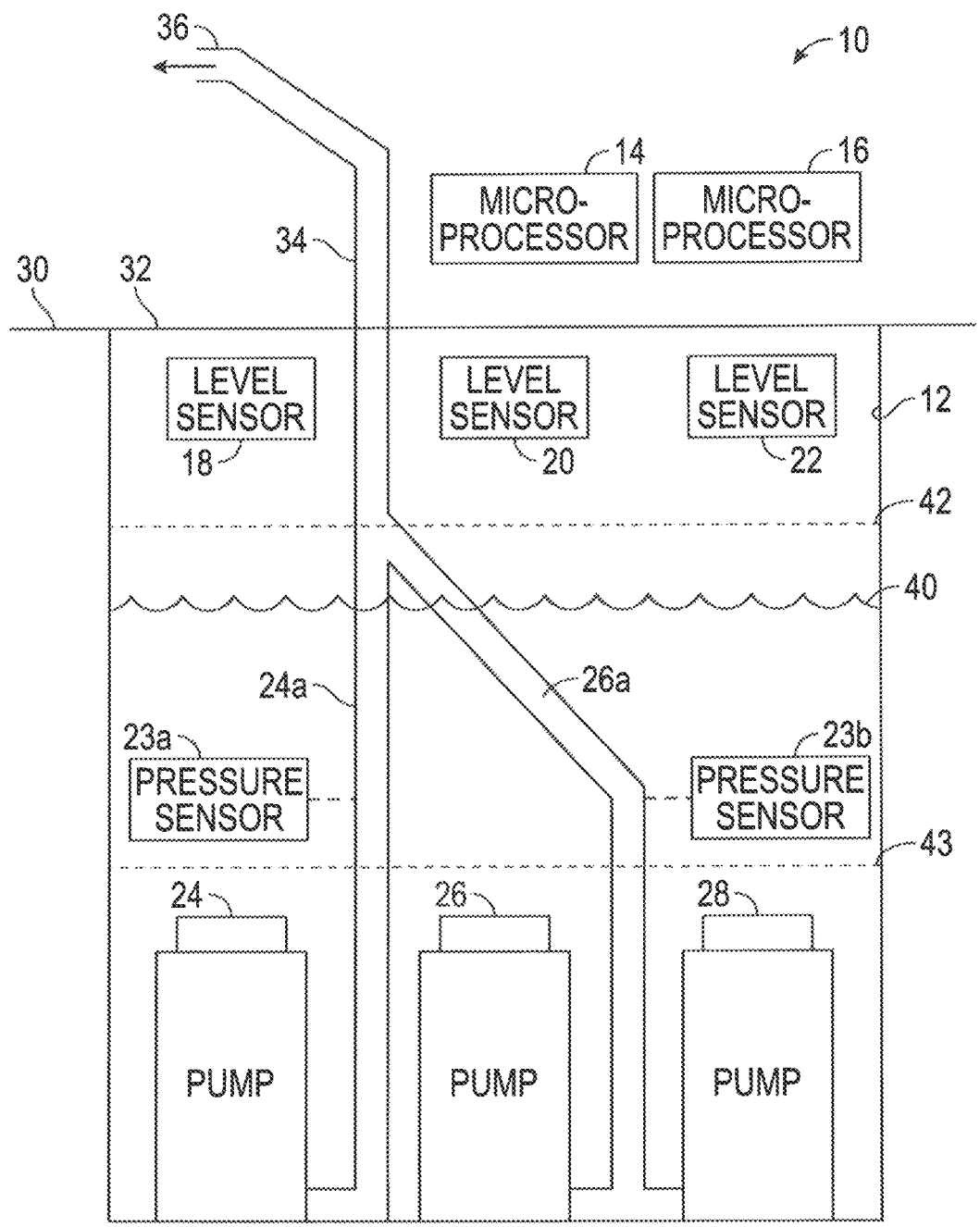
FIG. 1 is a schematic diagram of an improved sump pump system in accordance with this invention.

Referring now to the drawings, there is illustrated in FIG. 1 an improved sump pump system, indicated generally at 10, in accordance with this invention. The sump pump system 10 is particularly well suited for installation within a crock 12 provided in a floor 30 of a basement or other lowest level of a building, such as a house. The illustrated crock 12 has an upper opening 32 that is generally flush with the floor 30, although such is not required. Typically, one or more conventional drain conduits (not shown) communicate with the interior of the crock 12 to transmit water from within or about the structure to the interior of the crock 12 under the influence of gravity. However, the sump pump system 10 may be installed at any desired location within any type of building or other structure.

The illustrated sump pump system 10 includes a plurality of electronic controllers (such as the illustrated plurality of microprocessors 14 and 16), a plurality of water level sensors 18, 20, and 22, a plurality of water pressure sensors 23a and 23b, and a plurality of sump pumps 24, 26, and 28. In the illustrated embodiment, two of the microprocessors 14 and 16 are provided. Conventional power supplies 14a and 16a are connected to respectively supply electrical energy to operate each of the microprocessors 14 and 16.

In the illustrated embodiment, three of the water level sensors 18, 20, and 22 are provided within the crock 12, although a greater or lesser number of such water level sensors 18, 20, and 22 may be provided at any desired location or combination of locations. The illustrated water level sensors 18, 20, and 22 are each configured to individually determine an actual water level 40 within the crock 12. Preferably, the sensors 18, 20, and 22 are non-contact sensors, such as ultrasonic or laser sensors. However, any type, or combination of types, of water level sensors 18, 20, and 22 may be used in the sump pump system 10 including, for example, mechanical float sensors or any other type of analog or digital sensors.

In the illustrated embodiment, two of the water pressure sensors 23a and 23b are provided within the crock 12, although a greater or lesser number of such water pressure sensors may be provided at any desired locations. As shown in FIG. 1, the illustrated water pressure sensors 23a and 23b are respectively connected to a pair of discharge pipes 24a and 26a of the plurality of sump pumps 24, 26, and 28. In the illustrated embodiment, the sump pump 24 is connected to the discharge pipe 24a, while the sump pumps 26 and 28 are both connected to the discharge pipe 26a. However, a greater or lesser number of discharge pipes 24a and 26a may be connected in any desired manner to the sump pumps 24, 26, and 28. The discharge pipes 24a and 26a are, in turn, connected through a pipe arrangement 34 to an outlet 36 provided on the exterior of the building.

The water pressure sensors 23a and 23b are configured to respectively determine the pressures of the water being pumped by the plurality of sump pumps 24, 26, and 28 to the discharge pipes 24a and 26a, and from there on to the pipe arrangement 34 and the outlet 36. In this manner, the magnitude of the water pressure discharge flow generated from each, some, or all of the plurality of sump pumps 24, 26, and 28 can be determined. This allows for historic flow characteristics to be established and for indications of downstream obstructions or pump impeller problems to be detected. Any type of sensor may be used for water pressure sensors 23a and 23b.

Figure 2:
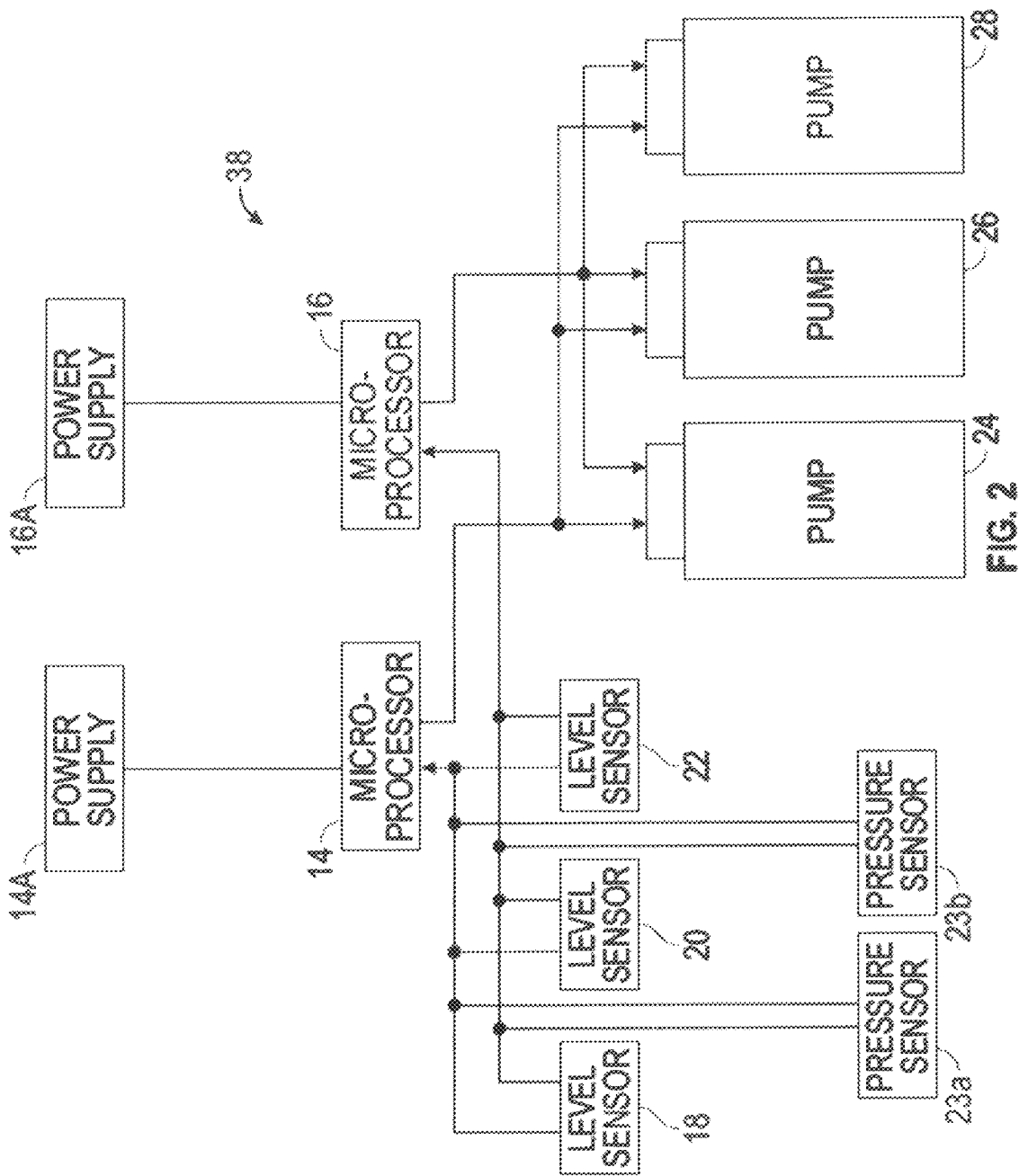
FIG. 2 is a schematic diagram of a control system for the improved sump pump system illustrated in FIG. 1.

Each of the plurality of microprocessors 14 and 16 is configured to operate each, some, or all of the plurality of sump pumps 24, 26, and 28 based on the signals received from any or all of the plurality of water level sensors 18, 20, and 22. Each of the plurality of microprocessors 14 and 16 is further configured to provide information relating to the operating status thereof and to generate an alarm in response to certain predetermined operating conditions. As shown in FIG. 2, each of the plurality of microprocessors 14 and 16 is electrically connected to each of the plurality of water level sensors 18, 20, and 22. Each of the plurality of microprocessors 14 and 16 is additionally electrically connected to each of the plurality of sump pumps 24, 26, and 28. The redundant electrical connections of each of the plurality of microprocessors 14 and 16 to each of the plurality of water level sensors 18, 20, and 22 and to each of the plurality of sump pumps 24, 26, and 28 provide increased reliability to the sump pump system 10. Although two microprocessors 14 and 16 are illustrated, it will be understood that a greater number of microprocessors may be included in the sump pump system 10.

As illustrated, each of the plurality of sump pumps 24, 26, and 28 is positioned within the crock 12, typically initially partially or totally submersed in the water contained therein. However, some or all of the plurality of sump pumps 24, 26, and 28 may be initially positioned above the actual water level 40 contained within the crock 12. Each of the plurality of sump pumps 24, 26, and 28 is configured to selectively pump water from the crock 12 through the discharge pipes 24a and 26a and through the pipe arrangement 34 to the outlet 36. Although shown as being uniformly positioned at the bottom of the crock 12, the plurality of sump pumps 24, 26, and 28 may be arranged in any desired pattern in the crock 12, including at different height levels. As mentioned above, the pipe arrangement 34 is connected to each of the discharge pipes 24a and 26a of the plurality of sump pumps 24, 26, and 28, with the outlet 36 being positioned outside of the building or other structure. This permits each of the plurality of sump pumps 24, 26, and 28 to pump water from the crock 12 and out of the building or other structure through the discharge pipes 24a and 26a. Although illustrated as including three sump pumps 24, 26, and 28, any number of sump pumps 24, 26, and 28 may be included in the sump pump system 10. Additionally, although the illustrated sump pumps 24, 26, and 28 are submersible in water, any other type of pump (or combination of types of pumps), such as pedestal-type pumps, may be utilized in the sump pump system 10. Finally, although a single pipe arrangement 34 is illustrated, it will be understood any number of pipe arrangements 34 may be included in the sump pump system 10.

Referring now to FIG. 2, a control system, indicated generally at 38, for the sump pump system 10 is illustrated. As shown therein, each of the plurality of microprocessors 14 and 16 is electrically connected via separate wires to each of the plurality of sensors 18, 20, and 22, and further to each of the plurality of sump pumps 24, 26, and 28. The redundancy provided by including a plurality of microprocessors 14 and 16, with each of the plurality of microprocessors 14 and 16 being separately connected to each of the plurality of sensors 18, 20, and 22 and to each of the plurality of sump pumps 24, 26, and 28, provides increased reliability to the control system 38. While the microprocessors 14 and 16 are illustrated as being connected to each of the plurality of sensors 18, 20, and 22 and to each of the plurality of sump pumps 24, 26, and 28 by individual wired connections, it will be understood any other types of connections may be used, including one or more wireless connections.

In normal operation, the plurality of sensors 18, 20, and 22 each provide water level signals to the plurality of microprocessors 14 and 16 regarding the actual water level 40 within the crock 12. In one embodiment, the plurality of sensors 18, 20, and 22 generate and send respective water level signals to the plurality of microprocessors 14 and 16. In response thereto, either (or both) of the plurality of microprocessors 14 and 16 may determine a median value of the plurality of water level signals generated by the plurality of sensors 18, 20, and 22. Upon identifying a median value that is greater than or equal to a predetermined upper level 42, either (or both) of the plurality of microprocessors 14 and 16 can send a signal to at least one of the plurality of sump pumps 24, 26, and 28. These signal(s) cause at least one of the plurality of sump pumps 24, 26, and 28 to turn on, thereby expelling water out of the crock 12 through the discharge pipes 24a and 26a, the pipe arrangement 34, and the outlet 36. Subsequently, upon identifying a median value that is less than or equal to a predetermined lower level 43, either (or both) of the plurality of microprocessors 14 and 16 can send a signal to at least one of the plurality of sump pumps 24, 26, and 28. These signal(s) cause at least one of the plurality of sump pumps 24, 26, and 28 to turn off. The plurality of sensors 18, 20, and 22 may send either analog or digital signals to the plurality of microprocessors 14 and 16 regarding the actual water level 40 contained within the crock 12.

As previously discussed, the microprocessors 14 and 16 may also be configured to identify when one or more of the plurality of sensors 18, 20, and 22 is or are faulty. After receiving the plurality of water level signals and subsequently determining the median value, each of the plurality of water level signals is then compared to the determined median value. If one of the plurality of water level signals is outside of a predetermined range about the identified median value, the sensor which generated that signal is designated as being faulty. After designating a sensor as being faulty, the plurality of microprocessors 14 and 16 may generate an alarm and subsequently exclude from consideration any further water level signals from the designated faulty sensor. The alarm may be of any type capable of alerting an operator of the faulty sensor, including noise, visual, or electronic notifications sent to enabled devices, such as a cell phone.

Figure 3:
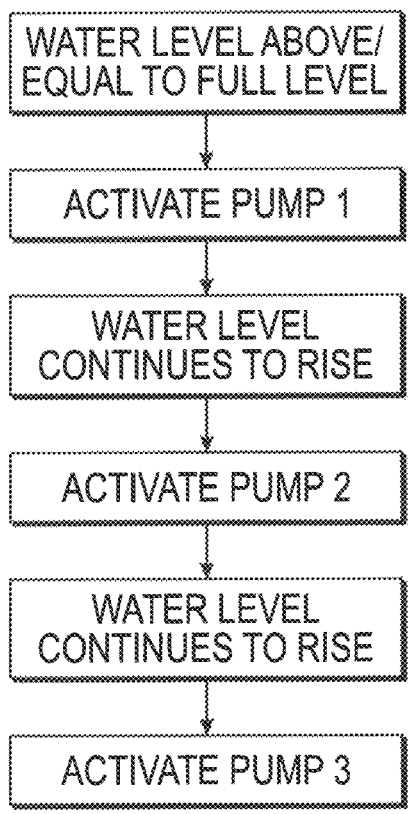
FIG. 3 is a flow chart of a first method of operating the improved sump pump and control systems illustrated in FIGS. 1 and 2.

Referring now to FIG. 3, a first method 44 of controlling the sump pump system 10 during a single high water event is illustrated. The first method 44 includes an initial step wherein when the actual water level 40 is determined by to be greater than the predetermined upper level 42 (see FIG. 1), then either (or both) of the plurality of microprocessors 14 and 16 initially activates a first one of the plurality of sump pumps 24, 26, and 28. Subsequently, if it is determined that the actual water level 40 is still rising (such as continuing to be greater than the predetermined upper level 42), then either (or both) of the plurality of microprocessors 14 and 16 activates a second one of the plurality of sump pumps 24, 26, and 28. In addition to activating the second one of the plurality of sump pumps 24, 26, and 28, the plurality of microprocessors 14 and 16 may generate an alarm to alert the operator of at least one of a high flow event and/or a pump failure. The alarm may be of any type capable of alerting the operator of the faulty sensor, including noise, visual, or electronic notifications sent to enabled devices, such as a cell phone. Subsequently still, if it is determined that the actual water level 40 is still rising (such as yet again continuing to the greater than the predetermined upper level 42), then either (or both) of the plurality of microprocessors 14 and 16 activates a third one of the plurality of sump pumps 24, 26, and 28. In addition to activating the third one of the plurality of sump pumps 24, 26, and 28, the plurality of microprocessors 14 and 16 may also generate another alarm to alert the operator of at least one of a high flow event and/or a potential pump failure.

Figure 4:
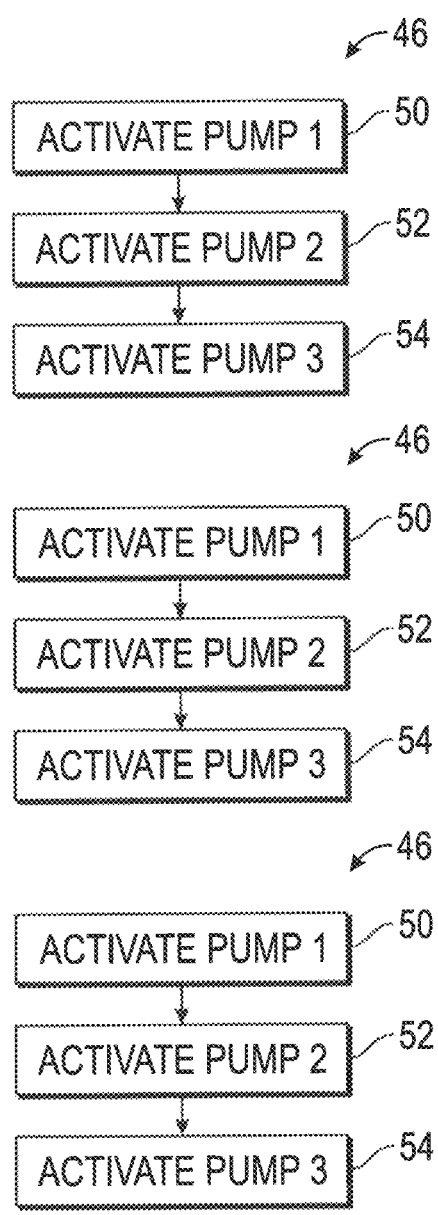
FIG. 4 are flow charts of a second method of operating the improved sump pump and control systems illustrated in FIGS. 1 and 2.

Referring now to FIG. 4, a second method 46 of controlling the sump pump system 10 during multiple (three in the illustrated embodiment) separate high water events is illustrated. When a first high water event is detected, either (or both) of the plurality of microprocessors 14 and 16 activates the first, second, and third ones of the plurality of sump pumps 24, 26, and 28 in a predetermined sequence. In the illustrated embodiment, either (or both) of the plurality of microprocessors 14 and 16 initially activates the first one 24 of the plurality of sump pumps 24, 26, and 28. If the water level continues to rise, either (or both) of the plurality of microprocessors 14 and 16 then activates the second one 26 of the plurality of sump pumps 24, 26, and 28. If the water level still continues to rise, either (or both) of the plurality of microprocessors 14 and 16 further activates the third one 28 of the plurality of sump pumps 24, 26, and 28. When a second high water event is subsequently detected, either (or both) of the plurality of microprocessors 14 and 16 activates the first, second, and third ones of the plurality of sump pumps 24, 26, and 28 in same predetermined sequence (namely, the first pump 24, then the second pump 26, then the third pump 28). When a third high water event is subsequently detected, either (or both) of the plurality of microprocessors 14 and 16 activates the first, second, and third ones of the plurality of sump pumps 24, 26, and 28 in same predetermined sequence (namely, the first pump 24, then the second pump 26, then the third pump 28).

Referring now to FIG. 5, a third method 46 of controlling the sump pump system 10 during multiple (three in the illustrated embodiment) separate high water events is illustrated. When a first high water event is detected, either (or both) of the plurality of microprocessors 14 and 16 activates the first, second, and third ones of the plurality of sump pumps 24, 26, and 28 in a first predetermined sequence. In the illustrated embodiment, either (or both) of the plurality of microprocessors 14 and 16 initially activates the first one 24 of the plurality of sump pumps 24, 26, and 28. If the water level continues to rise, either (or both) of the plurality of microprocessors 14 and 16 then activates the second one 26 of the plurality of sump pumps 24, 26, and 28. If the water level still continues to rise, either (or both) of the plurality of microprocessors 14 and 16 further activates the third one 28 of the plurality of sump pumps 24, 26, and 28.

However, when a second high water event is subsequently detected, either (or both) of the plurality of microprocessors 14 and 16 activates the first, second, and third ones of the plurality of sump pumps 24, 26, and 28 in a second predetermined sequence that is different from the first predetermined sequence (namely, actuating the second pump 26 first, then the third pump 28 second, then the first pump 24 third). Similarly, when a third high water event is subsequently detected, either (or both) of the plurality of microprocessors 14 and 16 activates the first, second, and third ones of the plurality of sump pumps 24, 26, and 28 in a third predetermined sequence that is different from the first and second predetermined sequences (namely, actuating the third pump 28 first, then the first pump 24 second, then the second pump 26 third).

Regardless of whether the second method 46 utilizing a sequential actuation methodology or the third method 48 utilizing the round-robin actuation methodology is implemented, the sump pump system 10 may further include an emergency backup pump (not shown). The emergency backup pump would either be separate from the plurality of sump pumps 24, 26, and 28, or be designated as one of such sump pumps 24, 26, and 28. The emergency backup pump may be used in the event of the failure of one or more of the plurality of sump pumps 24, 26, and 28 to prevent the water level 40 from undesirably rising out of the crock 12, thereby preventing damage to the structure.

Referring now to FIGS. 6 and 7, the sump pump system 10 may be controlled by the operator via a local control box 74 or via an enabled device 76, such as a mobile phone. The local control box 74 is electrically connected to the sump pump system 10 via a wired connection, although other connection types may be used, such as a wireless connection. In one embodiment, the local control box 74 provides the operator with information relating to the operation and initial setup of the sump pump system 10. However, the local control box 74 may provide the operator with any type of information related to the sump pump system 10.

The enabled device 76 is connected to the sump pump system 10 via a communications network 78, such as by Wi-Fi, the internet, or a cellular network. However, the enabled device 76 may also be connected to the sump pump system 10 via a wired connection. The enabled device 76 may provide the operator with information relating to the operation and setup of the sump pump system 10. However, as the enabled device 76 is generally remote to the sump pump system 10, it is desirable to provide more detailed information that is readily available to the operator when operating the local control box 74. Thus, the enabled device 76 may provide structural information regarding the sump pump system 10. Specifically, the enabled device 76 may provide information relating to the current water level 40 in the crock 12. The enabled device 76 may also identify the number and location of the plurality of sump pumps 24, 26, and 28 located in the crock 12. For example, two sump pumps 24 and 26 may reside on the bottom of the crock 12, while the third sump pump 28 may be positioned ten inches from the bottom of the crock 12. However, the enabled device 76 may also provide the operator with additional structural information relating to the sump pump system 10.

The enabled device 76 may also provide operational information relating to the sump pump system 10. Specifically, the water levels 42 and 43 for actuation and de-actuation of each of the plurality of sump pumps 24, 26, and 28 may be provided by the enabled device 76. Additionally, the enabled device 76 may permit the operator to configure the plurality of sump pumps 24, 26, and 28 for operation, for example by altering the water levels 42 and 43 for actuation and de-actuation of the plurality of sump pumps 24, 26, and 28. The enabled device 76 may also provide the operator with additional operational information relating to the sump pump system 10.

The enabled device 76 may also provide diagnostic information relating to the sump pump system 10. Specifically, the enabled device 76 may provide the operator with information on the current operational health of the plurality of water level sensors 18, 20, and 22 and the plurality of sump pumps 24, 26, and 28. The enabled device 76 may also provide the operator with information relating to the performance history of the sump pump system 10. The performance history data may include the operational history of each of the plurality of sump pumps 24, 26, and 28 and the historical actual water levels 40 of each of the plurality of water level sensors 18, 20, and 22 in the crock 12. The enabled device 76 may be further configured to receive an alarm, via the internet (Wi-Fi) or a cellular network, generated by the plurality of microprocessors 14 and 16 of the sump pump system 10. The alarms may include alarms generated in response to a loss of power, the failure of a pump, the failure of a sensor, a high flow event, or an excessively high water level.

Lastly, the enabled device 76 may provide the operator with a further diagnostic tool, namely, a pump operation test capability. Although described as being provided by the enabled device 76, it must be understood that the provision of structural, operational, and diagnostic information, and the generation of alarms to alert the operator of a problem with the sump pump system 10, may also be provided by the local control box 74.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A sump pump system comprising:
   a plurality of sump pumps adapted to be disposed within a crock;
   a plurality of water level sensors adapted to be disposed within the crock, each of the plurality of water level sensors adapted to generate water level signals that are representative of a water level within the crock; and
   a plurality of electronic controllers, wherein each of the plurality of water level sensors is connected to each of the plurality of electronic controllers, and wherein each of the plurality of electronic controllers is connected to operate some or all of the plurality of sump pumps in response to the water level signals.

2. The sump pump system defined in claim 1 wherein each of the plurality of electronic controllers is a microprocessor.

3. The sump pump system defined in claim 1 wherein either some or all of the plurality of electronic controllers is configured to determine a median value of the plurality of water level signals generated by the plurality of sensors, and wherein the plurality of electronic controllers is configured to operate some or all of the plurality of sump pumps in response to the median value of the plurality of water level signals.

4. The sump pump system defined in claim 3 wherein the plurality of electronic controllers is configured to turn on some or all of the plurality of sump pumps in response to the median value of the plurality of water level signals being greater than or equal to a predetermined upper level.

5. The sump pump system defined in claim 4 wherein the plurality of electronic controllers is configured to turn off some or all of the plurality of sump pumps in response to the median value of the plurality of water level signals being less than or equal to a predetermined lower level.

6. The sump pump system defined in claim 1 wherein either some or all of the plurality of electronic controllers is configured to determine a median value of the plurality of water level signals generated by the plurality of sensors, and wherein the plurality of electronic controllers is configured to identify any of the plurality of sensors is generating a water level signal that is beyond a predetermined range from the median value.

7. The sump pump system defined in claim 6 wherein either some or all of the plurality of electronic controllers is configured to generate an alarm when any of the plurality of sensors is generating a water level signal that is beyond a predetermined range from the median value.

8. The sump pump system defined in claim 6 wherein either some or all of the plurality of electronic controllers is configured to exclude any of the plurality of sensors that is generating a water level signal that is beyond a predetermined range from the median value.

9. The sump pump system defined in claim 1 wherein the plurality of electronic controllers is connected to operate some or all of the plurality of sump pumps sequentially in a same order when operated in response to the water level signals.

10. The sump pump system defined in claim 1 wherein the plurality of electronic controllers is connected to operate some or all of the plurality of sump pumps sequentially in a different order when operated in response to the water level signals.

* * * * *